United States Patent
Robin et al.

(10) Patent No.: US 10,584,991 B2
(45) Date of Patent: Mar. 10, 2020

(54) APPARATUS FOR ULTRASONICALLY MEASURING THE FLOW RATE OF A FLUID IN A MEASURING CHANNEL, ACHIEVING AN ATTENUATION OF THE PARASITIC SIGNALS

(71) Applicants: EFS SA, Montagny (FR); ECOLE CENTRALE DE LYON, Ecully (FR); CENTRE NATIONAL DE LA RECHERCHE SCIENTIFIQUE, Paris (FR); UNIVERSITE CLAUDE BERNARD LYON 1, Villeurbanne (FR); INSTITUT NATIONAL des SCIENCES APPLIQUEES DE LYON, Villeurbanne (FR)

(72) Inventors: Julian Robin, Lyons (FR); Pascal Gucher, St Genis les Ollieres (FR); Alexandre Huchon, Soucieu en Jarrest (FR); Sébastien Ollivier, Lyons (FR); Philippe Blanc-Benon, Lyons (FR)

(73) Assignees: EFS SA, Montagny (FR); ECOLE CENTRALE DE LYON, Ecully (FR); CENTRE NATIONAL DE LA RECHERCHE SCIENTIFIQUE, Paris (FR); UNIVERSITE CLAUDE BERNARD LYON 1, Villeurbanne (FR); INSTITUT NATIONAL DES SCIENCES APPLIQUEES DE LYON, Villeurbanne (FR)

( * ) Notice: Subject to any disclaimer, the term of this patent is extended or adjusted under 35 U.S.C. 154(b) by 35 days.

(21) Appl. No.: 15/950,029

(22) Filed: Apr. 10, 2018

(65) Prior Publication Data
US 2018/0299306 A1    Oct. 18, 2018

(30) Foreign Application Priority Data
Apr. 10, 2017    (FR) .................................... 17 53113

(51) Int. Cl.
*G01F 1/66*    (2006.01)
(52) U.S. Cl.
CPC .............. *G01F 1/662* (2013.01); *G01F 1/667* (2013.01)
(58) Field of Classification Search
CPC ...................................................... G01F 1/66
See application file for complete search history.

(56) References Cited

U.S. PATENT DOCUMENTS 4,325,262 A * 4/1982 Meisser .................. G01F 1/662
73/861.28
5,583,301 A * 12/1996 Strauss .................... G01F 1/662
73/861.29

(Continued)

*Primary Examiner* — Jewel V Dowtin
(74) *Attorney, Agent, or Firm* — Cantor Colburn LLP

(57) ABSTRACT

An apparatus for ultrasonically measuring the flow rate of a fluid in a measuring channel including fluid supply passages at its ends, this measuring channel forming a waveguide made into a solid body, comprising at each end a transducer capable of emitting or receiving ultrasounds circulating in the axis of the channel, where each transducer includes a shell transmitting the ultrasounds, comprising a waveguide facing the measuring channel, and outside this waveguide shapes orientating the ultrasounds in directions different from that of the channel.

11 Claims, 1 Drawing Sheet

(56) References Cited

U.S. PATENT DOCUMENTS

| | | | |
|---|---|---|---|
| 7,213,468 B2* | 5/2007 | Fujimoto | C21D 7/00 |
| | | | 702/48 |
| 7,254,494 B2 | 8/2007 | Botter | |
| 7,673,527 B2* | 3/2010 | Ehring | G01F 1/662 |
| | | | 435/2 |
| 7,703,337 B1* | 4/2010 | Feller | G01F 1/662 |
| | | | 73/861.27 |
| 7,775,125 B2 | 8/2010 | Rhodes | |
| 9,267,829 B2 | 2/2016 | Chevrier et al. | |
| 10,036,763 B2 | 7/2018 | Hies et al. | |
| 2010/0095782 A1 | 4/2010 | Ferencz et al. | |
| 2014/0345390 A1 | 11/2014 | Gottlieb et al. | |
| 2017/0227568 A1 | 8/2017 | Hies et al. | |

\* cited by examiner

APPARATUS FOR ULTRASONICALLY MEASURING THE FLOW RATE OF A FLUID IN A MEASURING CHANNEL, ACHIEVING AN ATTENUATION OF THE PARASITIC SIGNALS

CROSS REFERENCE TO RELATED APPLICATION

This application is related to and claims the benefit of French Patent Application Number 17/53113 filed on Apr. 10, 2017, the contents of which are herein incorporated by reference in their entirety.

TECHNICAL FIELD

The present disclosure concerns an apparatus for ultrasonically measuring the flow rate of a fluid.

BACKGROUND

The flow rate of a fluid in a pipe may be measured by means of an ultrasonic flowmeter, according to the method for measuring the difference of transit time durations. This means is nowadays widespread thanks to progress in electronics which allow measuring time intervals with a high resolution.

A known type of ultrasonic flowmeter, presented in particular by the document US-A1-20140345390, includes a fluid passage cylinder comprising at each end an inlet or an outlet for the fluid flowing into a direction perpendicular to this cylinder.

Each end of the fluid passage cylinder has a closure face perpendicular to this cylinder, receiving, at the outside on one side an ultrasonic emitter, and on the other side a receiver receiving the waves emitted by the emitter.

The cylinder further includes a tube fitted inside, presenting an axial perforation forming a channel receiving the flow rate of the fluid as well as the ultrasonic wave sent by the emitter. The tube made of an ultrasound-absorbing material, such as a polymer, achieves an attenuation of the propagation of the sound waves scattering on the sides of the channel, in order to avoid parasitic propagations of the signal resulting in a noise on the receiver in addition to the relevant signal transmitted only by the fluid, which is expected by the receiver.

To the propagation velocity of the sound signal in the fluid, is added the fluid velocity resulting in a small variation of the time interval between the emission by the emitter and the reception by the receiver, which is measured. Knowing moreover the characteristics of the fluid and the geometry of this fluid passage, a fluid velocity as well as the volume flow rate are deduced.

Nonetheless, this type of flowmeters may raise problems because the tube attenuating the propagation of sound waves still lets parasitic waves pass which deliver a measurement noise on the receiver.

Particularly, a complementary measuring method using this type of flowmeter consists in measuring the propagation times of an ultrasonic wave between an emitter and a receiver, called transducers, in a flowing of the fluid, when this wave is emitted co-currently in the direction of the flow, and counter-currently in the reverse direction.

For this purpose, the upstream transducer is energized which emits a co-current wave, which is received by the downstream transducer. Then, the downstream transducer is energized which emits a counter-current wave, which is received by the upstream transducer. Thus, each transducer alternately switches from an emission state to a reception state.

Since the distance between the two transducers is known, the difference between the two transit times of the wave allows determining the flowing velocity of the fluid according to the physical characteristics of the latter, mainly the pressure and the temperature. The geometry of the conduit allows afterwards calculating the volume flow rate of the flowing.

Particularly with this type of measuring method, the measurement noise coming from the parasitic waves transmitted by the solid body of the measuring channel, may be troublesome by disturbing the accuracy of the measurement of the transit times of the wave in the fluid.

BRIEF SUMMARY

The present disclosure aims in particular at avoiding these drawbacks of the prior art, particularly at reducing the measurement noise of the ultrasonic flowmeters.

The disclosure provides to this end an apparatus for ultrasonically measuring the flow rate of a fluid in a measuring channel including fluid supply passages at its ends, this measuring channel forming a waveguide made into a solid body, comprising at each end a transducer capable of emitting or receiving ultrasounds circulating in the axis of the channel, this apparatus being remarkable in that each transducer includes a shell transmitting the ultrasounds, comprising a waveguide facing the measuring channel, and outside this waveguide shapes orientating the ultrasounds in directions different from that of the channel.

An advantage of this ultrasonic measuring apparatus is that, in a simple and cost-effective manner, the conical shape at the rear of the waveguide facing the channel, performs an emission of parasitic ultrasonic waves in the solid body with an angle with respect to the axis of the measuring channel directed toward the opposite transducer, which allows diverting these waves from the shortest path toward the receiver. Thus, we attenuate or delay the arrival of measurement noises on the reception transducer, which come from the propagation of waves in the solid of the body around the measuring channel.

The ultrasonic measuring apparatus according to the disclosure may further include one or more of the following characteristics, which may be combined together.

Advantageously, the shapes sending the ultrasounds in a different direction include a revolution shape centered on the axis of the channel, which bears on the solid body.

Advantageously, each transducer shell includes a contour which is fitted into a cavity formed at the rear of the measuring channel.

In this case, each waveguide advantageously includes a front transverse face which is disposed just behind a fluid supply passage.

Particularly, each transducer shell may include, starting from the rear, a straight cylindrical portion, the revolution shape which narrows the diameter, then the waveguide forming a straight cylindrical portion filling the end of the measuring channel.

Advantageously, the revolution shape constitutes a cone presenting an opening angle comprised between 60 and 120°. This angle avoids an emission of parasitic waves in the body directed along the axis directly toward the receiver transducer, and returns them to the rear.

Advantageously, the measuring apparatus includes a rear axial tightening system of the transducer shell. This axial tightening allows pressing the conical shape of the shell on the corresponding shape of the body, in order to transmit the ultrasonic waves by these surfaces.

In this case, the axial tightening system may include a nut engaged on a thread so of the body of the apparatus, disposed along the axis of the measuring channel.

Advantageously, the body of the apparatus includes between the two fluid supply passages at least one transverse crack which splits this body into two distinct axial portions. The at least one crack forms an interruption which limits the transmission of the parasitic ultrasonic waves in the solid of the body.

In this case, the at least one crack advantageously includes an air layer, or a layer of materials with an acoustic impedance different from that of the body, which is interposed between the two axial portions of the body.

Advantageously, the body of the apparatus includes two perforations forming the fluid supply passages, opening at the ends of the measuring channel, which form with this channel an angle comprised between 120 and 150°.

BRIEF DESCRIPTION OF THE DRAWINGS

Other characteristics and advantages of the disclosure will become apparent upon reading the following description, given only as example, with reference to the following appended figures.

DETAILED DESCRIPTION

Figure 1:
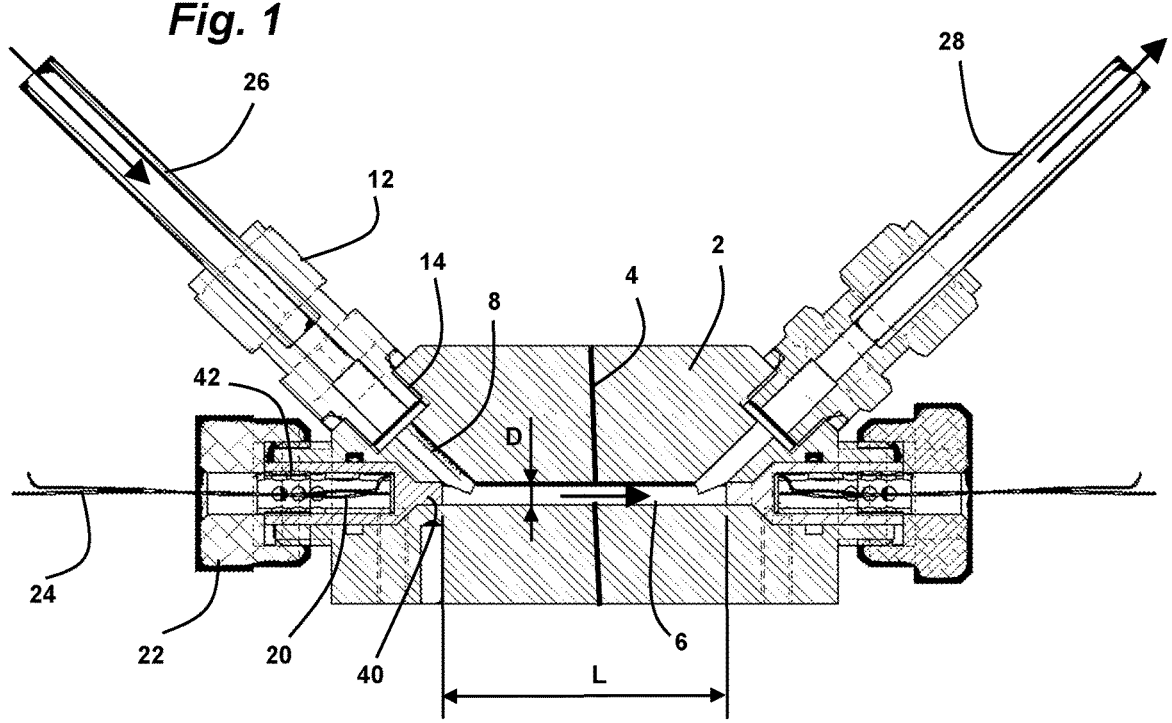
FIG. 1 is an axial section of an ultrasonic measuring apparatus according to the disclosure.
Figure 2:
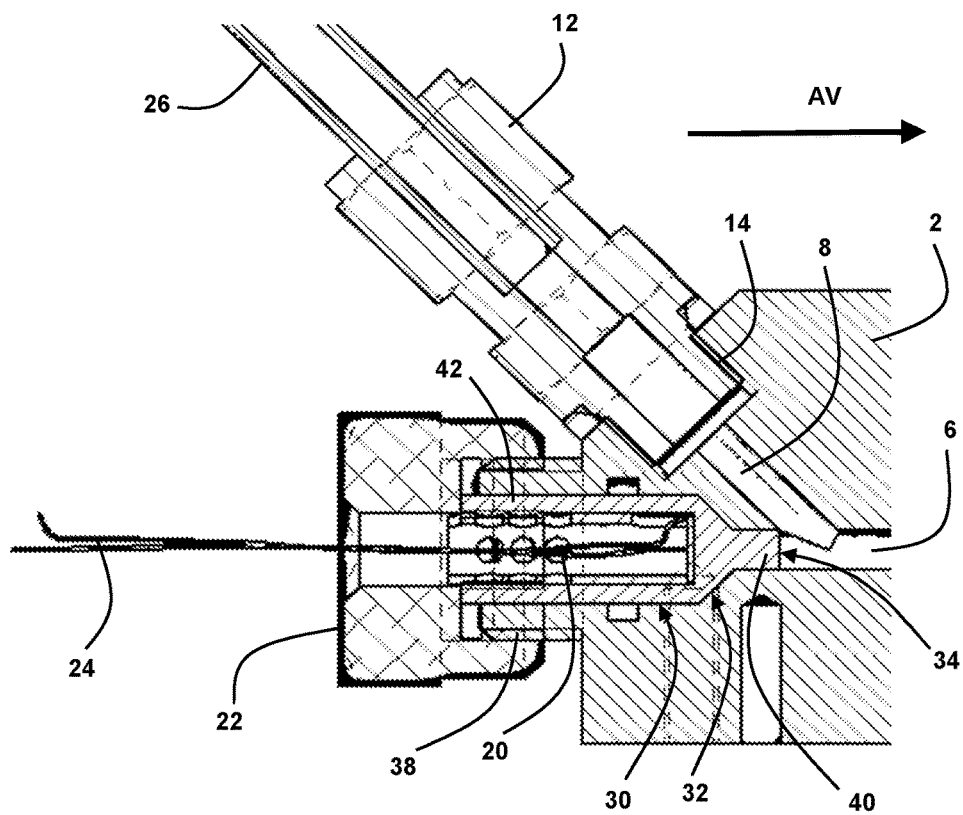
FIG. 2 is a detail view of this measuring apparatus showing a transducer.

FIGS. 1 and 2 present an ultrasonic measuring apparatus including a body 2 comprising a rectilinear measuring channel 6 disposed along a longitudinal axis, connected to supply perforations 8, comprising on one side an inlet perforation and an upstream transducer 20, and on the other side an outlet perforation and a downstream transducer.

Conventionally, the front side of each transducer 20 is defined along its axis, as the side facing the channel 6, emitting or receiving the ultrasounds.

The supply perforations 8 disposed in a same plane passing through the axis of the channel 6 are each inclined at an angle of 135° with respect to this channel. This considerable angle, advantageously comprised between 120° and 150°, promotes the flowing of the fluid by limiting the pressure drop resulting from a very sharp angle between the supply perforations 8 and the axis of the channel 6.

Each supply perforation 8 receives a metal fitting 12 screwed by a thread 14 on the body 2, holding an inlet pipe 26 or an outlet pipe 28 disposed in the axis of this perforation.

Alternatively, the supply perforations 8 could be disposed in different planes, according to the desired orientations of the inlet 26 or outlet 28 pipes connected onto the measuring apparatus.

Each end of the channel 6 receives a piezoelectric transducer 20 forming a cylinder disposed along the axis of this channel, inserted from the rear into a cylindrical cavity of a shell 42 held by a rear tightening nut 22. The transducer 20 includes power supply wires 24 coming out from the rear, along its axis.

Each end of the channel 6 is extended by a cavity opening toward the outside of the body 2, including, starting from the outside, a large-diameter bore, then a conical surface centered on the narrowing axis, presenting an opening angle of 90°, and finally the perforation of the channel presenting a constant diameter D.

Each transducer shell 42 presents, starting from the rear, a cylindrical shape 30 fitted into the large-diameter bore of the end cavity of the channel 6, then a conical constriction 32 fitted on the conical surface of this cavity, which bears on this surface by the tightening of the rear nut 22.

The bore of the end cavity of the channel 6 includes an internal groove 36 receiving a sealing gasket which is tightened on the cylindrical shape 30 of the shell 42, in order to ensure a static sealing.

The transducer shell 42 finally presents a cylindrical stud fitting into the perforation of the channel 6, forming a waveguide 40 which ends with a front transverse face 34 disposed just before the supply perforation 8. The transducer shell 42 is made of a material whose behavior in transmission of ultrasounds and behavior in pressure and temperature are known.

The waveguide 40 constitutes a portion filling the end of the measuring channel 6, located ahead of the conical constriction 32, which extends up to the branch between this channel and the supply perforation 8. Thus, there is no recessed area of the fluid in the measuring channel 6, which would reduce the reliability of the measurement.

The transducers 20 have a piezoelectric ceramic which is the element converting the electrical voltages into vibrations, or vice versa, presenting a diameter greater than the diameter D of the measuring channel. Thus, the direction of propagation of the wave useful to the measurement emitted by a transducer 20, passing through the waveguide 40 and then exiting from the front transverse face 34 of this waveguide, is parallel to the axis of the measuring channel 6, so as to propagate along this channel toward the opposite transducer.

In addition, the conical constriction 32 of the front portion of each transducer shell 42, presents an opening angle of 90° which allows reflecting to the rear the parasitic ultrasonic waves emitted by the transducer on the sides before the waveguide 40. In general, the opening angle of the conical constriction 32 can be comprised between 60 and 120°.

In this manner, we reduce the forward propagation of the ultrasonic waves in the solid of the body 2 of the apparatus, which would reach the opposite transducer, in order to avoid sending parasitic waves thereto that would be added to those transiting into the fluid of the measuring channel 6.

The body 2 of the measuring apparatus includes at each end of the channel 6 a circular boss centered on the axis of this channel, extending this body rearwards, having an external thread 38.

A tightening nut 22 engaged on the thread 38, axially tightens the rear face of the transducer shell 42 so as to press its front conical constriction 32 on the corresponding conical surface of the end cavity of the channel 6. The tightening nut 22 includes a central perforation enabling the power supply wires 24 of the transducer 20 to come out from the rear.

The measuring channel 6 has a length L defined as being the distance between the two front transverse faces 34 of the waveguides 40, and a constant diameter D, comprising an L/D ratio which is advantageously comprised between 3 and 300.

The body 2 of the measuring apparatus includes between the two supply perforations 8 a transverse crack 4 which splits this body into two distinct axial portions, while maintaining sealing at the level of the measuring channel 6 in order to ensure the passage of the fluid. The transverse crack 4 may include particularly an air layer, or a layer of materials with an acoustic impedance different from that of the body 2, attenuating the ultrasounds.

In this manner, the transverse crack 4 constitutes a separation considerably attenuating the solid-path propagation of the parasitic ultrasounds along the body 2 beyond this separation, which would start from the emitter transducer and reach the receiver transducer by generating a measurement noise.

The measuring apparatus according to the disclosure is particularly suitable for measuring fuel flow rates intended to the injection on a heat engine, including pressure ranges comprised between 0 and 3000 bars, and temperature ranges comprised between −30 and 140° C.

For this type of application comprising very short injection times, a high sampling frequency is needed in order to obtain an accurate measurement.

In particular, it is possible to energize the upstream transducer emitting a co-current wave, which is received by the downstream transducer. Then, the downstream transducer emitting a counter-current wave, which is received by the upstream transducer is energized. These receptions present minimal parasitic signals thanks to the different arrangements of the disclosure.

Knowing the physical characteristics of the measuring apparatus and of the fluid, as well as the pressure and temperature conditions, the difference between the two transit times of the wave allows calculating in an accurate manner the volume flow rate of the flowing, with minimal parasitic signals.

The invention claimed is:

1. An apparatus for ultrasonically measuring the flow rate of a fluid in a measuring channel including fluid supply passages at its ends, this measuring channel forming a waveguide made into a solid body, comprising at each end a transducer capable of emitting or receiving ultrasounds circulating in the axis of the channel, wherein each transducer includes a shell transmitting the ultrasounds, comprising a waveguide facing the measuring channel, and outside this waveguide shapes orientating the ultrasounds in directions different from that of the channel.

2. The measuring apparatus according to claim 1, wherein the shapes sending the ultrasounds in a different direction include a revolution shape centered on the axis of the channel, which bears on the solid body.

3. The measuring apparatus according to claim 1, wherein each transducer shell includes a contour which is fitted into a cavity formed at the rear of the measuring channel.

4. The measuring apparatus according to claim 3, wherein each waveguide includes a front transverse face which is disposed just at the rear of a fluid supply passage.

5. The measuring apparatus according to claim 2, wherein each transducer shell includes, starting from the rear, a straight cylindrical portion, the revolution shape which narrows the diameter, then the waveguide forming a straight cylindrical portion filling the end of the measuring channel.

6. The measuring apparatus according to claim 1, wherein the revolution shape constitutes a cone presenting an opening angle comprised between 60 and 120°.

7. The measuring apparatus according to claim 1, further comprising a rear axial tightening system of the transducer shell.

8. The measuring apparatus according to claim 7, wherein the axial tightening system includes a nut engaged on a thread of the body of the apparatus, disposed along the axis of the measuring channel.

9. The measuring apparatus according to claim 1, wherein the body of the apparatus includes between the two fluid supply passages at least one transverse crack which splits this body into two distinct axial portions.

10. The measuring apparatus according to claim 9, wherein the at least one crack includes an air layer, or a layer of materials with an acoustic impedance different from that of the body, which is interposed between the two axial portions of the body.

11. The measuring apparatus according to claim 1, wherein the body of the apparatus includes two perforations forming the fluid supply passages, opening at the ends of the measuring channel, which form with this channel an angle comprised between 120 and 150°.

* * * * *